(12) United States Patent
Park et al.

(10) Patent No.: US 11,387,042 B2
(45) Date of Patent: Jul. 12, 2022

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Yong Park, Suwon-si (KR); Jang Yeol Lee, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 16/863,039

(22) Filed: Apr. 30, 2020

(65) Prior Publication Data

US 2020/0258683 A1 Aug. 13, 2020

Related U.S. Application Data

(63) Continuation of application No. 16/186,111, filed on Nov. 9, 2018, now Pat. No. 10,679,790.

(30) Foreign Application Priority Data

Aug. 10, 2018 (KR) ........................ 10-2018-0093708

(51) Int. Cl.
*H01G 4/008* (2006.01)
*H01G 4/30* (2006.01)
(Continued)

(52) U.S. Cl.
CPC ........... *H01G 4/0085* (2013.01); *H01G 4/012* (2013.01); *H01G 4/30* (2013.01); *H01G 4/1227* (2013.01); *H01G 4/232* (2013.01); *H01G 4/248* (2013.01)

(58) Field of Classification Search
CPC ...... H01G 4/0085; H01G 4/232; H01G 4/012; H01G 4/1227; H01G 4/33; H01G 4/248; H01G 4/1218; H01G 4/005; H01G 4/30
See application file for complete search history.

(56) References Cited

U.S. PATENT DOCUMENTS 9,105,400 B2 8/2015 Hiramatsu
9,384,897 B2 7/2016 Kim
(Continued)

FOREIGN PATENT DOCUMENTS

CN 107578919 A 1/2018
CN 107799306 A 3/2018
(Continued)

OTHER PUBLICATIONS

U.S. Notice of Allowance dated Jan. 31, 2020 issued in U.S. Appl. No. 16/186,111.
(Continued)

*Primary Examiner* — Michael P McFadden
(74) *Attorney, Agent, or Firm* — Morgan, Lewis & Bockius LLP

(57) ABSTRACT

A multilayer ceramic capacitor includes a ceramic body including a dielectric layer and having first and second surfaces opposing each other in a width direction, third and fourth surfaces connecting the first and second surfaces in a length direction, and fifth and sixth surfaces opposing each other in a thickness direction, internal electrodes disposed inside the ceramic body, exposed through the first and second surfaces, and having one end portion exposed through the third or fourth surface, and first and second side margin portions disposed on edges of the internal electrodes, exposed through the first and second surfaces. In a cross-section cut along a width-thickness plane of the ceramic body, an area of an oxide region disposed on the edges of the internal electrodes is less than 10% of an overall area of the
(Continued)

internal electrodes exposed through the first and second surfaces.

16 Claims, 7 Drawing Sheets

(51) Int. Cl.
*H01G 4/012* (2006.01)
*H01G 4/12* (2006.01)
*H01G 4/248* (2006.01)
*H01G 4/232* (2006.01)

(56) References Cited

U.S. PATENT DOCUMENTS

| | | | |
|---|---|---|---|
| 10,373,761 | B2 | 8/2019 | Mizuno |
| 2012/0229951 | A1 | 9/2012 | Kim |
| 2013/0063862 | A1 | 3/2013 | Kim |
| 2014/0125194 | A1 | 5/2014 | Lee |
| 2014/0185185 | A1 | 7/2014 | Okajima et al. |
| 2014/0301014 | A1* | 10/2014 | Kim ................. H01G 4/12 361/301.4 |
| 2015/0340155 | A1 | 11/2015 | Fukunaga |
| 2017/0076869 | A1 | 3/2017 | Okai et al. |
| 2017/0287642 | A1 | 10/2017 | Ono et al. |
| 2018/0061575 | A1* | 3/2018 | Mizuno ................. H01G 4/008 |
| 2018/0108482 | A1* | 4/2018 | Kogure ................. H01G 4/30 |
| 2018/0261390 | A1* | 9/2018 | Sakate ................. H01G 4/30 |
| 2018/0294097 | A1* | 10/2018 | Ono ................. H01G 4/30 |
| 2019/0355518 | A1* | 11/2019 | Harada ................. H01G 4/30 |

FOREIGN PATENT DOCUMENTS

| | | |
|---|---|---|
| JP | 2011-023707 A | 2/2011 |
| JP | 2014-143392 A | 8/2014 |
| JP | 2017-011172 A | 1/2017 |
| JP | 2017-183468 A | 10/2017 |
| KR | 10-2010-0136917 A | 12/2010 |

OTHER PUBLICATIONS

U.S. Non-Final Office Action dated Dec. 11, 2019 issued in U.S. Appl. No. 16/186,111.
Chinese Office Action dated Mar. 3, 2022, issued in corresponding Chinese Patent Application No. 201910021895.X. (with English translation).

* cited by examiner

MULTILAYER CERAMIC CAPACITOR AND METHOD OF MANUFACTURING THE SAME

CROSS-REFERENCE TO RELATED APPLICATION(S)

This application is a continuation application of U.S. patent application Ser. No. 16/186,111, filed on Nov. 9, 2018, which claims benefit of priority to Korean Patent Application No. 10-2018-0093708 filed on Aug. 10, 2018 in the Korean Intellectual Property Office, the disclosures of which are incorporated herein by reference in their entireties.

TECHNICAL FIELD

The present disclosure relates to a multilayer ceramic capacitor and a method of manufacturing the same, for adjusting an oxide region disposed on an end portion of an internal electrode to enhance reliability.

BACKGROUND

In general, an electronic component using a ceramic material, for example, a capacitor, an inductor, a piezoelectric element, a varistor, or a thermistor, includes a ceramic body formed of a ceramic material, an internal electrode formed in the body, and an external electrode installed on a surface of the ceramic body to be connected to the internal electrode.

In accordance with the recent trend for miniaturized and multifunctional electronic products, a chip component has also been miniaturized and multifunctionalized and, thus, there also has been a need for high-capacity products with a small size and high capacity as a multilayer ceramic capacitor.

To achieve miniaturization and high capacity in a multilayer ceramic capacitor, an electrode effective area needs to be maximized (an effective volume fraction required to embody capacity needs to be increased).

As described above, to embody a miniaturized and high-capacity multilayer ceramic capacitor, a method of exposing the internal electrode in a width direction of the body to maximize an area of the internal electrode in the width direction through a marginless design and separately attaching a side margin portion to the exposed surface of the electrode in the width direction, prior to sintering, after such a chip is manufactured to complete a multilayer ceramic capacitor has been applied when the multilayer ceramic capacitor is manufactured.

However, during a procedure of forming a side margin portion in the above method, many voids may be generated at an interface between a ceramic body and a side margin portion, thereby degrading reliability.

Electric field concentration may occur due to the voids generated at an interface between the ceramic body and the side margin portion and, thus, there may be a problem in terms of a lowered breakdown voltage (BDV).

Density in terms of external sintering is degraded due to the voids, thereby lowering waterproof reliability.

In general, an oxide layer is formed in a void generated at an interface between the ceramic body and the side margin portion to enhance a breakdown voltage (BDV) and waterproof reliability, but there may be a problem in terms of an insufficient effect.

Accordingly, there has been a need for research to prevent a breakdown voltage (BDV) from being lowered and waterproof reliability from being degraded in a miniaturized and high-capacity product.

SUMMARY

An aspect of the present disclosure may provide a multilayer ceramic capacitor and a method of manufacturing the same method, for adjusting an oxide region disposed on an end portion of an internal electrode to enhance reliability.

According to an aspect of the present disclosure, a multilayer ceramic capacitor may include a ceramic body including a dielectric layer and having first and second surfaces opposing each other in a width direction of the ceramic body, third and fourth surfaces connecting the first and second surfaces in a length direction of the ceramic body, and fifth and sixth surfaces connected to the first to fourth surfaces and opposing each other in a thickness direction of the ceramic body, internal electrodes disposed inside the ceramic body, exposed through the first and second surfaces, and having one end portion exposed through the third or fourth surface, and first and second side margin portions disposed on edges of the internal electrode, exposed through the first and second surfaces. In a cross-section cut along a width-thickness plane of the ceramic body, an area of an oxide region disposed on the edges of the internal electrodes is less than 10% of an overall area of the internal electrodes exposed through the first and second surfaces.

According to another aspect of the present disclosure, a method of manufacturing a multilayer ceramic capacitor may include preparing a first ceramic green sheet on which a plurality of first internal electrode patterns are formed at a predetermined interval and a second ceramic green sheet on which a plurality of second internal electrode patterns are formed at a predetermined interval, forming a ceramic green sheet stack body by stacking the first and second ceramic green sheets in such a manner that the first and second internal electrode patterns overlap with each other, cutting the ceramic green sheet stack body to have a lateral surface through which edges of the first and second internal electrode patterns are exposed in a width direction, forming first and second side margin portions on the lateral surface through which the edges of the first and second internal electrode patterns are exposed, and preparing a ceramic body including a dielectric layer and internal electrodes by sintering the cut ceramic green sheet stack body portion. In a cross-section cut along a width-thickness plane of the ceramic body, an area of an oxide region disposed on edges of the internal electrodes may be less than 10% of an overall area of the internal electrodes exposed through a lateral surface of the ceramic body, and a thickness direction of the ceramic body may be a direction along which the internal electrodes are stacked, and a width direction of the ceramic body may be a direction along which the internal electrodes are exposed through the lateral surface.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
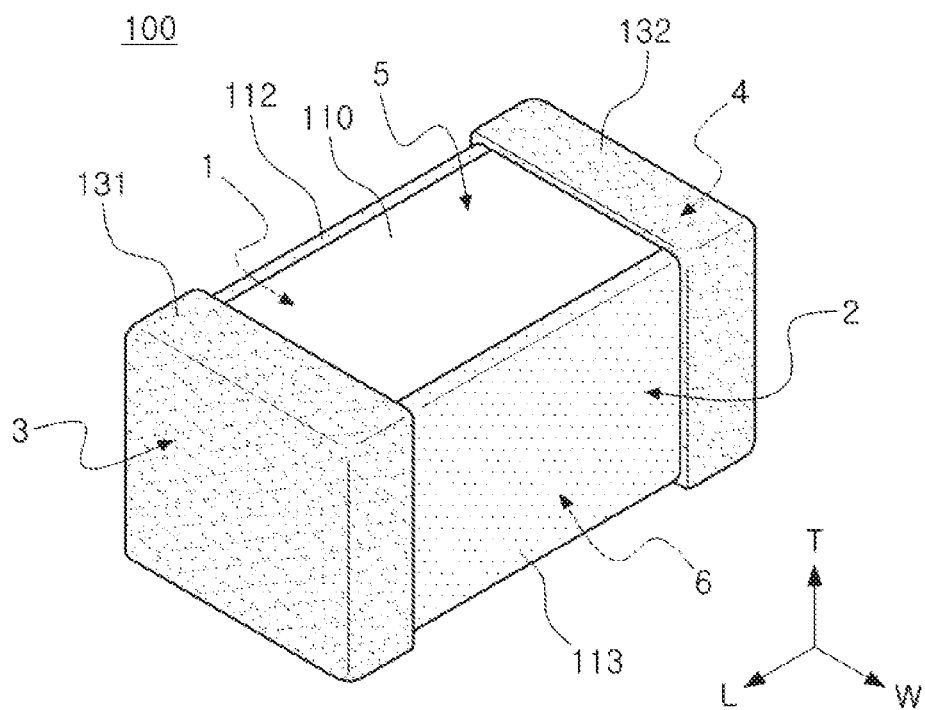
FIG. 1 is a schematic perspective view of a multilayer ceramic capacitor according to an exemplary embodiment of the present disclosure.

FIG. 1 is a schematic perspective view of a multilayer ceramic capacitor according to an exemplary embodiment of the present disclosure.

Figure 2:
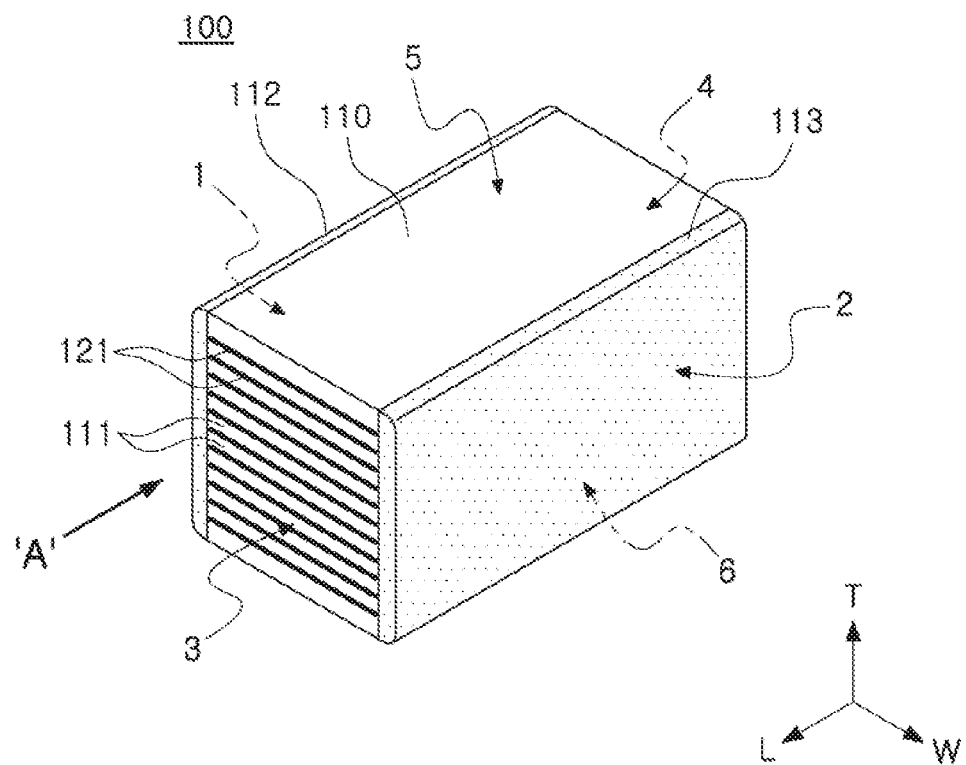
FIG. 2 is a perspective view showing an outer appearance of the ceramic body of FIG. 1.

FIG. 2 is a perspective view showing an outer appearance of the ceramic body of FIG. 1.

Figure 3:
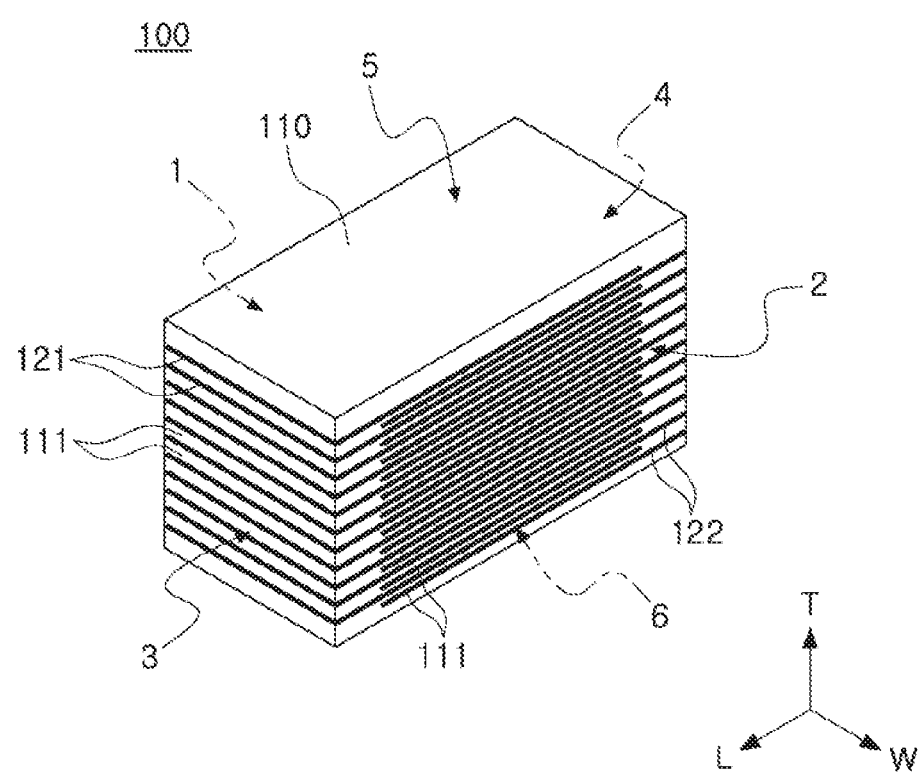
FIG. 3 is a perspective view showing a ceramic green sheet stack body before the ceramic body of FIG. 2 is sintered.

FIG. 3 is a perspective view showing a ceramic green sheet stack body before the ceramic body of FIG. 2 is sintered.

Figure 4:
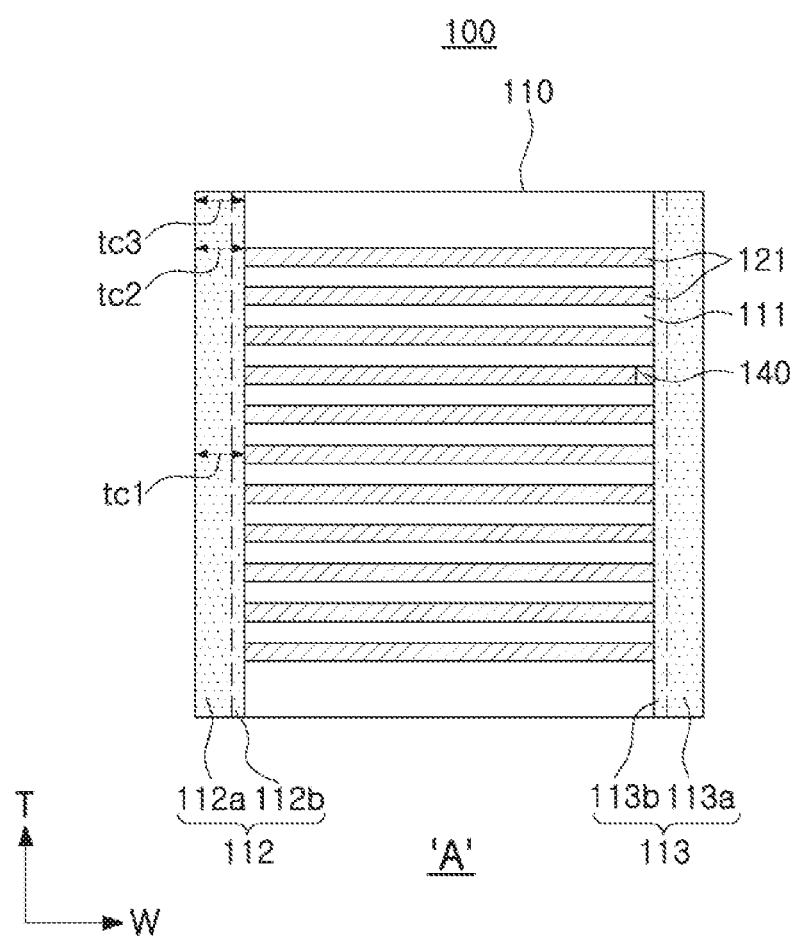
FIG. 4 is a lateral view viewed in a direction A of FIG. 2.

FIG. 4 is a lateral view viewed in a direction A of FIG. 2.

Referring to FIGS. 1 to 4, a multilayer ceramic capacitor 100 according to the present exemplary embodiment may include a ceramic body 110, a plurality of internal electrodes 121 and 122 formed inside the ceramic body 110, and external electrodes 131 and 132 formed on an external surface of the ceramic body 110.

The ceramic body 110 may have a first surface 1 and a second surface 2, which face each other, a third surface 3 and a fourth surface 4, which connect the first and second surfaces 1 and 2, and a fifth surface 5 and a sixth surface 6 which are upper and lower surfaces, respectively.

The first surface 1 and the second surface 2 may be defined as surfaces that face each other in a width direction W of the ceramic body 110, the third surface 3 and the fourth surface 4 may be defined as surfaces that face each other in a length direction L of the ceramic body 110, and the fifth surface 5 and the sixth surface 6 may be defined as surfaces that face each other in a thickness direction T of the ceramic body 110.

A shape of the ceramic body 110 is not particularly limited but may be a rectangular parallelepiped shape as shown in the drawing.

One end portion of each of the plurality of internal electrodes 121 and 122 formed inside the ceramic body 110 may be exposed through the third surface 3 or the fourth surface 4 of the ceramic body.

The internal electrodes 121 and 122 may include a first internal electrode 121 and a second internal electrode 122 as a pair of electrodes with different polarities.

One end portion of the first internal electrode 121 may be exposed through the third surface 3 and one end portion of the second internal electrode 122 may be exposed through the fourth surface 4.

The other end portion of the first internal electrode 121 may be spaced apart from the third surface 3 by a predetermined interval. The other end portion of the second internal electrode 122 may be spaced apart from the fourth surface 4 by a predetermined interval.

First and second external electrodes 131 and 132 may be respectively formed on the third surface 3 and the fourth surface 4 of the ceramic body and may be electrically connected to the internal electrode.

According to an exemplary embodiment of the present disclosure, the multilayer ceramic capacitor 100 may include the plurality of internal electrodes 121 and 122 that are disposed inside the ceramic body 110, are exposed through the first and second surfaces 1 and 2, and have one end portion exposed through the third surface 3 or the fourth surface 4, and a first side margin portion 112 and a second side margin portion 113 that are disposed on one edges of the plurality of internal electrodes 121 and 122 exposed through the first surface 1 and the second surface 2.

The plurality of internal electrodes 121 and 122 may be formed inside the ceramic body 110, each end of the plurality of internal electrodes 121 and 122 may be exposed through the first surface 1 and the second surface 2 that are surfaces in a width direction of the ceramic body 110, and the first side margin portion 112 and the second side margin portion 113 may be disposed on the exposed end portion.

An average thickness of the first side margin portion 112 and the second side margin portion 113 may be between 2 μm and 10 μm.

According to an exemplary embodiment of the present disclosure, the ceramic body 110 may include a stack structure in which a plurality of dielectric layers 111 is stacked, and the first side margin portion 112 and the second side margin portion 113 that are disposed on opposite lateral surfaces of the stack structure.

The plurality of dielectric layers 111 may be in a sintered state and may be integrated into each other in such a manner that a boundary between adjacent dielectric layers is not recognizable.

A length of the ceramic body 110 may correspond to a distance to the fourth surface 4 from the third surface 3 of the ceramic body.

A length of the dielectric layer 111 may form a distance between the third surface 3 and the fourth surface 4 of the ceramic body.

According to an exemplary embodiment of the present disclosure a length of the ceramic body may be, but is not limited to, 400 to 1400 μm. In more detail, the length of the ceramic body may be 400 to 800 μm or 600 to 1400 μm.

The internal electrodes 121 and 122 may be formed on the dielectric layer 111 and the internal electrodes 121 and 122 may be formed by being sintered inside the ceramic body across one dielectric layer.

Referring to FIG. 3, the first internal electrode 121 may be formed on the dielectric layer 111. The first internal electrode 121 may not be entirely formed in a length direction of a dielectric layer. That is, one end portion of the first internal electrode 121 may be spaced apart from the fourth surface 4 of the ceramic body by a predetermined interval, and the other end portion of the first internal electrode 121 may be formed up to the third surface 3 to be exposed through the third surface 3.

One end portion of the first internal electrode exposed through the third surface 3 of the ceramic body may be connected to the first external electrode 131.

Oppositely from the first internal electrode, one end portion of the second internal electrode 122 may be spaced apart from the third surface 3 by a predetermined interval and the other end of the second internal electrode 122 may be exposed through the fourth surface 4 to be connected to the second external electrode 132.

To embody a high-capacity multilayer ceramic capacitor, the internal electrode may be formed by stacking 400 or more layers but is not limited thereto.

The dielectric layer 111 may have the same width as a width of the first internal electrode 121. That is, the first internal electrode 121 may be entirely formed in a width direction of the dielectric layer 111.

According to an exemplary embodiment of the present disclosure, a width of a dielectric layer and a width of an internal electrode may be, but are not limited to, 100 to 900 μm. In more detail, the width of the dielectric layer and the width of the internal electrode may be 100 to 500 μm or 100 to 900 μm.

As a ceramic body is miniaturized, a thickness of a side margin portion may affect the electrical characteristics of a multilayer ceramic capacitor. According to an exemplary embodiment of the present disclosure, the thickness of the side margin portion may be formed with 10 μm or less to enhance the characteristics of a miniaturized multilayer ceramic capacitor.

That is, the side margin portion may be formed with a thickness equal to or less than 10 μm and, thus, an area in which internal electrodes overleap with each other to form capacity is increased, thereby embodying a high-capacity and miniaturized multilayer ceramic capacitor.

The ceramic body 110 may include an active portion that facilitates formation of capacity of a capacitor, and upper and lower cover portions that are respectively formed on upper and lower portions of the active portion as upper and lower margin portions.

The active portion may be formed by repeatedly stacking the plurality of first and second internal electrodes 121 and 122 across the dielectric layer 111.

The upper and lower cover portions may have the same material and configuration as the dielectric layer 111 except that the upper and lower cover portions do not include an internal electrode.

That is, the upper and lower cover portions may include a ceramic material and, for example, may include a barium titanate ($BaTiO_3$)-based ceramic material.

The upper and lower cover portions may each have a thickness equal to or less than 20 μm but are not limited thereto.

According to an exemplary embodiment of the present disclosure, the internal electrode and the dielectric layer may be simultaneously cut and formed and the internal electrode may be formed with the same width as a width of the dielectric layer, which is described below in more detail.

According to the present exemplary embodiment, the dielectric layer may be formed with the same width as a width of the internal electrode and, thus, an end of the plurality of internal electrodes 121 and 122 may be exposed through first and second surfaces in a width direction of the ceramic body 110.

The first side margin portion 112 and the second side margin portion 113 may be formed on opposite lateral surfaces in the width direction of the ceramic body 110, through which the ends of the plurality of internal electrodes 121 and 122 are exposed.

The first side margin portion 112 and the second side margin portion 113 may each have a thickness equal to or less than 10 μm. As a thickness of each of the first side margin portion 112 and the second side margin portion 113 is reduced, an area by which internal electrodes formed in the ceramic body overlap with each other may be relatively increased.

The thickness of each of the first side margin portion 112 and the second side margin portion 113 is not particularly limited as long as short circuits of the internal electrode exposed through the lateral surface of the ceramic body 110 is prevented and, for example, the first side margin portion 112 and the second side margin portion 113 may have a thickness equal to or greater than 2 μm.

When the first and second side margin portions have a thickness less than 2 μm, there may be a worry about degraded mechanical strength with respect to external shocks and, when the first and second side margin portions have a thickness greater than 10 μm, an overlapping area of the plurality of internal electrodes may be reduced and it may be difficult to achieve high capacity of a multilayer ceramic capacitor.

To maximize capacity of the multilayer ceramic capacitor, a method of thinning a dielectric layer, a method of stacking a multilayer thinned dielectric layer, a method of enhancing coverage of an internal electrode, or the like has been considered.

In addition, a method of enhancing an overlapping area of internal electrodes forming capacity has been considered.

To increase the overlapping area of the plurality of internal electrodes, a region of a margin portion, on which an internal electrode is not formed, needs to be minimized.

In particular, to increase the overlapping area of the plurality of internal electrodes as a multilayer ceramic capacitor is miniaturized, a region of the margin portion needs to be minimized.

According to the present exemplary embodiment, the internal electrode may be formed an entire width-direction area of the dielectric layer and a thickness of the side margin portion may be set to be equal to or less than 10 μm to increase the overlapping area of the internal electrode.

In general, as a dielectric layer is configured as a multi-layer, a thickness of the dielectric layer and the internal electrode may be reduced. Accordingly, the internal electrode may be frequently short-circuited. When the internal electrode is formed only in a portion of the dielectric layer, a step different may be generated due to the internal electrode to reduce an accelerated lifetime or reliability.

However, according to the present exemplary embodiment, even if a thinned internal electrode and dielectric layer are formed, the internal electrode may be formed on an entire width-direction portion of the dielectric layer and, thus, the overlapping area of the internal electrode may be increased to increase capacity of the multilayer ceramic capacitor.

The step difference due to the internal electrode may be reduced to enhance an accelerated lifetime to provide a multilayer ceramic capacitor with excellent reliability as well as excellent capacity characteristics.

According to an exemplary embodiment of the present disclosure, an oxide region 140 may be disposed on an end portion of an internal electrode, which is exposed through the first surface 1 and the second surface 2 and is less than 10% of an overall area of the plurality of internal electrodes 121 and 122, in a cross-section cut along a width-thickness plane of the ceramic body 110.

In general, many voids are generated at an interface between a ceramic body and a side margin portion, thereby degrading reliability.

Electric field concentration occurs due to the voids generated at an interface between the ceramic body and the side margin portion and, thus, there is a problem in terms of a lowered breakdown voltage (BDV).

Density in terms of external sintering is degraded due to the voids, thereby lowering waterproof reliability.

To overcome the problem, there is a method of forming an oxide layer in a void formed at the interface between the ceramic body and the side margin portion, but there is a problem in terms of an insufficient effect.

That is, to overcome the problem in terms of a lowered breakdown voltage (BDV) due to the void and degraded waterproof reliability, the edges of the internal electrode may be filled with conductive metal.

According to an exemplary embodiment of the present disclosure, the oxide region 140 may be disposed on an end portion of an internal electrode, which is exposed through the first surface 1 and the second surface 2 and is less than 10% of an overall area of the plurality of internal electrodes 121 and 122 in a cross-section cut along a width-thickness plane of the ceramic body 110. Thus, a breakdown voltage (BDV) may be increased and reliability may be enhanced.

That is, a ratio of the edges of the internal electrode, which is exposed through the first surface 1 and the second surface 2 and on which the oxide region 140 is disposed, to the overall area of the plurality of internal electrodes 121 and 122 may be adjusted to be less than 10% and, thus, the end portion may be filled with conductive metal while minimizing an oxide region disposed on the exposed edges of the internal electrode.

As described above, a ratio of conductive metal filled in the edges of the plurality of internal electrodes 121 and 122, which is exposed through the first surface 1 and the second surface 2 of the ceramic body 110, may be adjusted to exceed 90% and, thus, an effect of enhancing a breakdown voltage (BDV) and enhancing waterproof reliability may be excellent, as compared to the conventional case in which a plurality of voids are generated at an interface between a ceramic body and a side margin portion or an oxide region disposed on an end portion of an internal electrode occupies 10% or more of an overall area of the internal electrode.

When the oxide region is disposed on the edges of the internal electrode, which is exposed through the first surface 1 and second surface 2 and is equal to or greater than 10% of the overall area of the internal electrode, an effect of enhancing a breakdown voltage (BDV) and enhancing waterproof reliability may be achieved, as compared to the conventional case in which a plurality of voids are generated at an interface between a ceramic body and a side margin portion but, the effect is not satisfactory, as compared to the case in which the oxide region 140 is disposed on the edges of the internal electrode, forming less than 10% of the overall area of the internal electrode, like in an exemplary embodiment of the present disclosure.

To repress generation of a void at the interface between the ceramic body and the side margin portion and generation of the oxide region formed on the edges of the internal electrode, it may be the most ideal to fill an entire edges of the internal electrode with conductive metal but it may be very difficult to manufacture the internal electrode without any oxide region on the entire portion of the internal electrode.

Accordingly, it may be the most ideal that a lower limit of a ratio of edges of the internal electrode, on which the oxide region is disposed and which is exposed through the first surface 1 and the second surface 2 of the ceramic body 110, to the overall area of the internal electrode is 0% in a cross-section cut along a width-thickness plane of the ceramic body 110. According to an exemplary embodiment of the present disclosure, 0% may be excluded due to a limit to a process.

The conductive metal may be the same as conductive metal included in the internal electrode and may be, for example, nickel (Ni) but is not limited thereto.

According to an exemplary embodiment of the present disclosure, in a method of adjusting a ratio of the edges of the internal electrode, which is exposed through the first surface 1 and the second surface 2 and on which the oxide region 140 is disposed, to the overall area of the plurality of internal electrodes 121 and 122, to be less than 10%, a lateral-surface ceramic sheet with adhesives coated thereon is transferred to a lateral surface of the ceramic body during formation of the first and second side margin portions 112 and 113 to enhance adhesive force during a sintering procedure and, thus, generation of a void at the interface between the ceramic body and the side margin portion and generation of the oxide region formed on the exposed edges of the internal electrode may be repressed and controlled.

This is described below in detail.

Referring to FIG. 4, the first and second side margin portions 112 and 113 may be divided into first regions 112*a* and 113*a* adjacent to an external surface of the side margin portions 112 and 113 and second regions 112*b* and 113*b* adjacent to the internal electrodes 121 and 122 exposed through the first surface 1 and the second surface 2 of the ceramic body 110, in this case, content of magnesium (Mg) included in the second regions 112*b* and 113*b* may be greater than content of magnesium (Mg) included in the first regions 112*a* and 113*a*.

The first and second side margin portions 112 and 113 disposed on a lateral surface of the ceramic body 110 may be divided into two regions with different compositions and, in this case, content of magnesium (Mg) included in the second regions 112*b* and 113*b* may be adjusted to be greater than content of magnesium (Mg) included in the first regions 112*a* and 113*a*, thereby enhancing a breakdown voltage (BDV) and enhancing reliability.

In detail, content of magnesium (Mg) included in the second regions 112*b* and 113*b* of the side margin portion adjacent to the ceramic body may be adjusted to control a length of an oxide layer of an end of the internal electrode, which is exposed through a width-direction lateral surface of the ceramic body, thereby enhancing a breakdown voltage (BDV) and enhancing waterproof reliability.

According to an exemplary embodiment of the present disclosure, content of magnesium (Mg) included in the second regions 112*b* and 113*b* of the side margin portion adjacent to the ceramic body may be adjusted to repress generation of a void at an interface between the ceramic body and the side margin portion.

As described above, when generation of a void at the interface between the ceramic body and the side margin portion is repressed, electric field concentration may be alleviated due to reduction in the number of voids in which the most serious electric field concentration occurs and, thus, a breakdown voltage (BDV) may be increased and short failure may be reduced.

The first and second side margin portions 112 and 113 disposed on the lateral surface of the ceramic body 110 may be divided into two regions with different compositions and, in this case, content of magnesium (Mg) may be different for each region to enhance density of the first and second side margin portions 112 and 113, thereby improving waterproof characteristics.

In detail, content of magnesium (Mg) included in the second regions 112*b* and 113*b* of the first and second side margin portions 112 and 113 may be adjusted to be greater than content of magnesium (Mg) included in the first regions 112*a* and 113*a* at an outer side to enhance density of the first regions 112*a* and 113*a* of the side margin portions 112 and 113, thereby enhancing waterproof characteristics.

In particular, content of magnesium (Mg) included in the first regions 112*a* and 113*a* of the first and second side margin portions 112 and 113 adjacent to the external surface of the side margin portions 112 and 113 may be lowered to enhance adhesive force between the first external electrode 131 and the second external electrode 132.

A method of adjusting content of magnesium (Mg) included in the second regions 112*b* and 113*b* to be greater than content of magnesium (Mg) included in the first regions 112*a* and 113*a* may be performed by differently configuring a composition of a dielectric for forming a ceramic body and a composition of a dielectric for forming first and second side margin portions during a procedure of manufacturing a multilayer ceramic capacitor.

That is, when content of magnesium (Mg) in the composition of the dielectric for forming the first and second side margin portions is increased and content of magnesium (Mg) is adjusted via diffusion during a sintering and plasticization procedure, differently from the composition of the dielectric for forming the ceramic body, the content of magnesium (Mg) included in the second regions 112*b* and 113*b* may be adjusted to be greater than the content of magnesium (Mg) included in the first regions 112*a* and 113*a*.

Accordingly, an electric field concentrated on edges of the internal electrode may be alleviated and breakdown as one of main failures of a multilayer ceramic capacitor may be prevented, thereby enhancing the reliability of the multilayer ceramic capacitor.

According to an exemplary embodiment of the present disclosure, a mole ratio of content of magnesium (Mg) of the second regions 112*b* and 113*b* to content of titanium (Ti) included in the first and second side margin portions 112 and 113 may be between 10% and 30%.

A mole ratio of content of magnesium (Mg) of the second regions 112*b* and 113*b* to content of titanium (Ti) included in the first and second side margin portions 112 and 113 may be adjusted to be between 10% and 30% to enhance a breakdown voltage (BDV), thereby enhancing waterproof reliability.

When a mole ratio of content of magnesium (Mg) of the second regions 112*b* and 113*b* to content of titanium (Ti) included in the first and second side margin portions 112 and 113 is less than 10%, generation of a void at the interface between the ceramic body and the side margin portion may not be sufficiently repressed to lower a breakdown voltage (BDV) and to increase short failure When a mole ratio of content of magnesium (Mg) of the second regions 112*b* and 113*b* to content of titanium (Ti) included in the first and second side margin portions 112 and 113 is greater than 30%, there may be a problem in that reliability due to reduction in sintering characteristics and distribution of a breakdown voltage (BDV) are not uniform.

According to an exemplary embodiment of the present disclosure, a miniaturized multilayer ceramic capacitor may be configured in such a manner that the dielectric layer 111 has a thickness equal to or less than 0.4 µm and the internal electrodes 121 and 122 have a thickness equal to or less than 0.4 µm.

According to an exemplary embodiment of the present disclosure, when a dielectric layer and an internal electrode of a thin film that includes the dielectric layer 111 with a thickness equal to or less than 0.4 µm and the internal electrodes 121 and 122 with a thickness equal to or less than 0.4 µm are applied, a problem in terms of reliability due to a void generated at an interface between the ceramic body and the side margin portion and an oxide region formed on the edges of the internal electrode is a very important issue.

That is, in the case of a conventional multilayer ceramic capacitor, even if density of the oxide region formed on the edges of the internal electrode, which is exposed through a width-direction surface of the ceramic body, or a ratio of the portion of the internal electrode, on which the oxide region is formed, to an overall area of the internal electrode is not adjusted, there is a serious problem in terms of reliability.

However, according to an exemplary embodiment of the present disclosure, with regard to a product to which the dielectric layer and the internal electrode of the thin film are applied, the oxide region may be adjusted not to be formed on the edges of the internal electrode, which is exposed through the width-direction surface of the ceramic body, to prevent reduction in BDV and reliability due to a void generated at an interface between the ceramic body and the side margin portion and density of the oxide region formed on the edges of the internal electrode, which is exposed through the width-direction surface of the ceramic body.

That is, according to an exemplary embodiment of the present disclosure, a ratio of the edges of the internal electrode, on which the oxide region 140 is exposed, to an overall area of the plurality of internal electrodes 121 and 122 exposed through the first surface 1 and second surface 2 may be adjusted to be less than 10% in a cross-section cut along a width-thickness plane of the ceramic body 110. Thus, in the case of a thin film that includes the dielectric layer 111 and the first and second internal electrodes 121 and 122 with a thickness equal to or less than 0.4 µm, breakdown voltage (BDV) may be enhanced and waterproof reliability may also be enhanced.

However, the thin film may not refer to the case in which the dielectric layer 111 and the first and second internal electrodes 121 and 122 have a thickness equal to or less than 0.4 µm and may be interpreted as a concept including a dielectric layer and internal electrode with a smaller thickness than a conventional product.

The first regions 112*a* and 113*a* may have a width equal to or less than 12 µm and the second regions 112*b* and 113*b* may have a width equal to or less than 3 µm but the present disclosure is not limited thereto.

Referring to FIG. 4, a ratio of a thickness tc2 of a region of the first or second side margin portion, contacting an end of an internal electrode disposed as the outermost portion, to a thickness tc1 of a region of the first or second side margin portion, contacting an end of an internal electrode disposed at a central portion of the plurality of internal electrodes 121 and 122, may be equal to or less than 1.0.

A lower limit of the ratio of the thickness tc2 of a region of the first or second side margin portion, contacting an end of an internal electrode disposed as the outermost portion, to the thickness tc1 of a region of the first or second side margin portion, contacting an end of an internal electrode disposed at a central portion, is not particularly limited but may be equal to or greater than 0.9.

According to an exemplary embodiment of the present disclosure, unlike the prior art, the first or second side margin portion is formed by attaching a ceramic green sheet to a lateral surface of a ceramic body and, thus, a thickness for each position of the first or second side margin portion may be constant.

That is, a conventionally, a side margin portion is formed by coating or printing ceramic slurry and, thus, a deviation in the side margin portion for each position is serious.

In detail, conventionally, a thickness of a region of the first or second margin portion, contacting an end of an internal electrode disposed at a central portion of a ceramic body, may be greater than a thickness of the other region.

For example, conventionally, a ratio of a thickness of a region of the first or second margin portion, contacting an end of an internal electrode disposed as the outermost portion, to the thickness of a region of the first or second margin portion, contacting an end of an internal electrode disposed at the central portion may be less than 0.9 and, thus, a deviation between the thicknesses is high.

As such, in the conventional case in which a deviation in a thickness of a side margin portion for each position is high, a multilayer ceramic capacitor with a constant size has a large portion occupied by the side margin portion and, thus, it is not possible to ensure a large size of a capacity formation portion and it is difficult to ensure high capacity.

On the other hand, according to an exemplary embodiment of the present disclosure, an average thickness of the first and second side margin portions 112 and 113 is between 2 μm and 10 μm and a ratio of the thickness tc2 of the region of the first or second side margin portion, contacting an end of an internal electrode disposed as the outermost portion, to a thickness tc1 of a region of the first or second side margin portion, contacting an end of an internal electrode disposed at a central portion of the plurality of internal electrodes 121 and 122, is between 0.9 and 1.0 and, thus, the side margin portion may have a small thickness and a low thickness deviation to ensure a large size of a capacity formation portion.

According to an exemplary embodiment of the present disclosure, a ceramic green sheet may be attached to a lateral surface of a ceramic body and, thus, a thickness of the first or second side margin portion for each position may be constant, differently from the conventional case.

Accordingly, it may be possible to embody a high-capacity multilayer ceramic capacitor.

Referring to FIG. 4, a ratio of a thickness tc3 of a region of the first or second side margin portion, contacting an edge of the ceramic body 110, to the thickness tc1 of a region of the first or second side margin portion, contacting an end of an internal electrode disposed at a central portion of the plurality of internal electrodes 121 and 122, may be equal to or less than 1.0.

A lower limit of the ratio of thickness tc3 of a region of the first or second side margin portion, contacting the edge of the ceramic body 110, to the thickness tc1 of a region of the first or second side margin portion, contacting an end of an internal electrode disposed at a central portion, may be equal to or greater than 0.9.

According to the above characteristics, a large size of a capacity formation portion may be ensured due to a small thickness deviation of the side margin portion for each region and, thus, it may be possible to embody a high-capacity multilayer ceramic capacitor.

FIGS. 5A to 5F are schematic cross-sectional views of a method of manufacturing a multilayer ceramic capacitor according to another exemplary embodiment of the present disclosure.

Another exemplary embodiment of the present disclosure may provide a method of manufacturing a multilayer ceramic capacitor, including preparing a first ceramic green sheet on which a plurality of first internal electrode patterns are formed at a predetermined interval and a second ceramic green sheet on which a plurality of second internal electrode patterns are formed at a predetermined interval, forming a ceramic green sheet stack body by stacking the first and second ceramic green sheets in such a manner that the first and second internal electrode patterns intersect each other, cutting the ceramic green sheet stack body to have a lateral surface through which edges of the first and second internal electrode patterns are exposed in a width direction, forming a first side margin portion and a second side margin portion on the lateral surface through which the edges of the first and second internal electrode patterns are exposed, and preparing a ceramic body including a dielectric layer and first and second internal electrodes by sintering the cut ceramic green sheet stack body portion and, in this case, the first and second side margin portions are divided into a first region adjacent to an external surface of the side margin portion and a second region adjacent to the first and second internal electrodes and content of magnesium (Mg) included in the second region is greater than content of magnesium (Mg) included in the first region.

Hereinafter, a method of manufacturing a multilayer ceramic capacitor according to another exemplary embodiment of the present disclosure is described.

Figure 5A:
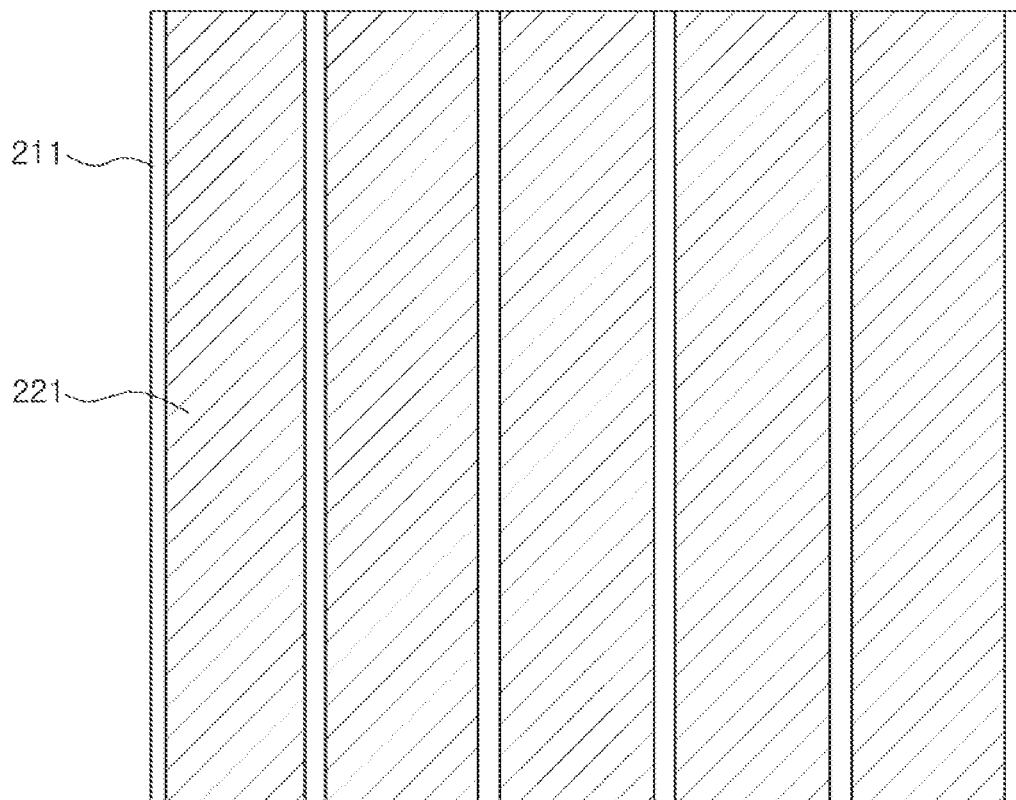
FIGS. 5A to 5F are schematic cross-sectional views of a method of manufacturing a multilayer ceramic capacitor according to another exemplary embodiment of the present disclosure.

As shown in FIG. 5A, a plurality of stripe-type first internal electrode patterns 221 may be formed on a ceramic green sheet 211 at a predetermined interval. The plurality of stripe-type first internal electrode patterns 221 may be formed in parallel to each other.

The ceramic green sheet 211 may be formed of a ceramic paste including a ceramic powder, an organic solvent, and an organic binder.

The ceramic powder may be a material with a high dielectric constant but may be, but is not limited to, a barium titanate ($BaTiO_3$)-based material, a lead perovskite-based material, a strontium titanate ($SrTiO_3$)-based material, or the like and, for example, may be a barium titanate ($BaTiO_3$) powder. The ceramic green sheet 211 is sintered to form the dielectric layer 111 configuring the ceramic body 110.

The stripe-type first internal electrode pattern 221 may be formed of an internal paste including conductive metal. The conductive metal may be, but is not limited to, nickel (Ni), copper (Cu), palladium (Pd), or an alloy thereof.

A method of forming the stripe-type first internal electrode pattern 221 on the ceramic green sheet 211 may not be particularly limited but, for example, may be a printing method such as a screen printing method or a gravia printing method.

Although not illustrated, a plurality of stripe-type second internal electrode patterns 222 may be formed on another ceramic green sheet 211 at a predetermined interval.

Hereinafter, a ceramic green sheet on which the first internal electrode pattern 221 is formed may be referred to as a first ceramic green sheet and a ceramic green sheet on which the second internal electrode pattern 222 may be referred to as a second ceramic green sheet.

Figure 5B:
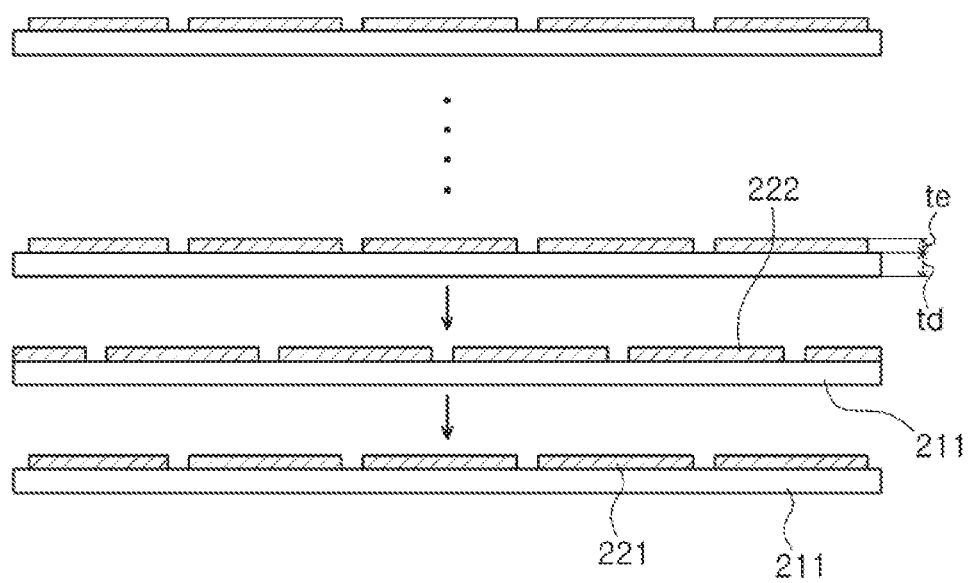

Then, as shown in FIG. 5B, first and second ceramic green sheets may be alternately stacked in such a manner that the stripe-type first internal electrode pattern 221 and the stripe-type second internal electrode pattern 222 are stacked to intersect each other.

Then, the stripe-type first internal electrode pattern 221 may become the first internal electrode 121 and the stripe-type second internal electrode pattern 222 may be the second internal electrode 122.

According to another exemplary embodiment of the present disclosure, the first and second ceramic green sheets may have a thickness td equal to or less than 0.6 μm and the first and second internal electrode patterns may have a thickness te equal to or less than 0.5 μm.

The present disclosure relates to a miniaturized and high-capacity multilayer ceramic capacitor including a thin film that includes a dielectric layer with a thickness equal to or less than 0.4 µm and an internal electrode with a thickness equal to or less than 0.4 µm and, thus, the first and second ceramic green sheets may have a thickness td equal to or less than 0.6 µm and the first and second internal electrode patterns may have a thickness te equal to or less than 0.5 µm.

Figure 5C:
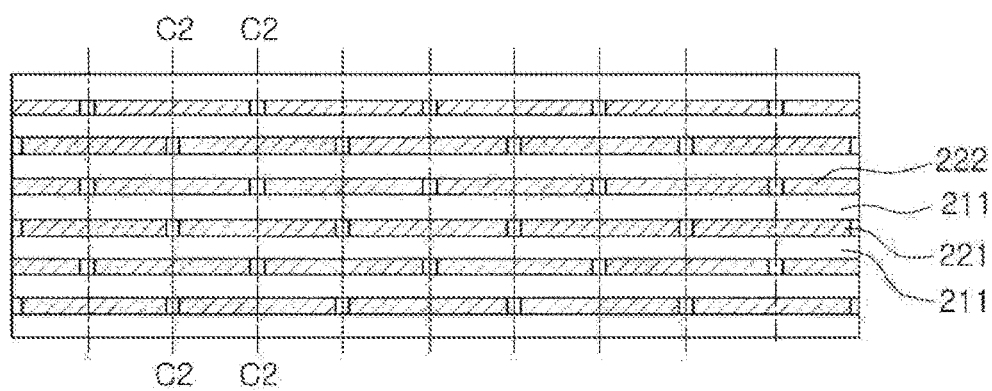
Figure 5D:
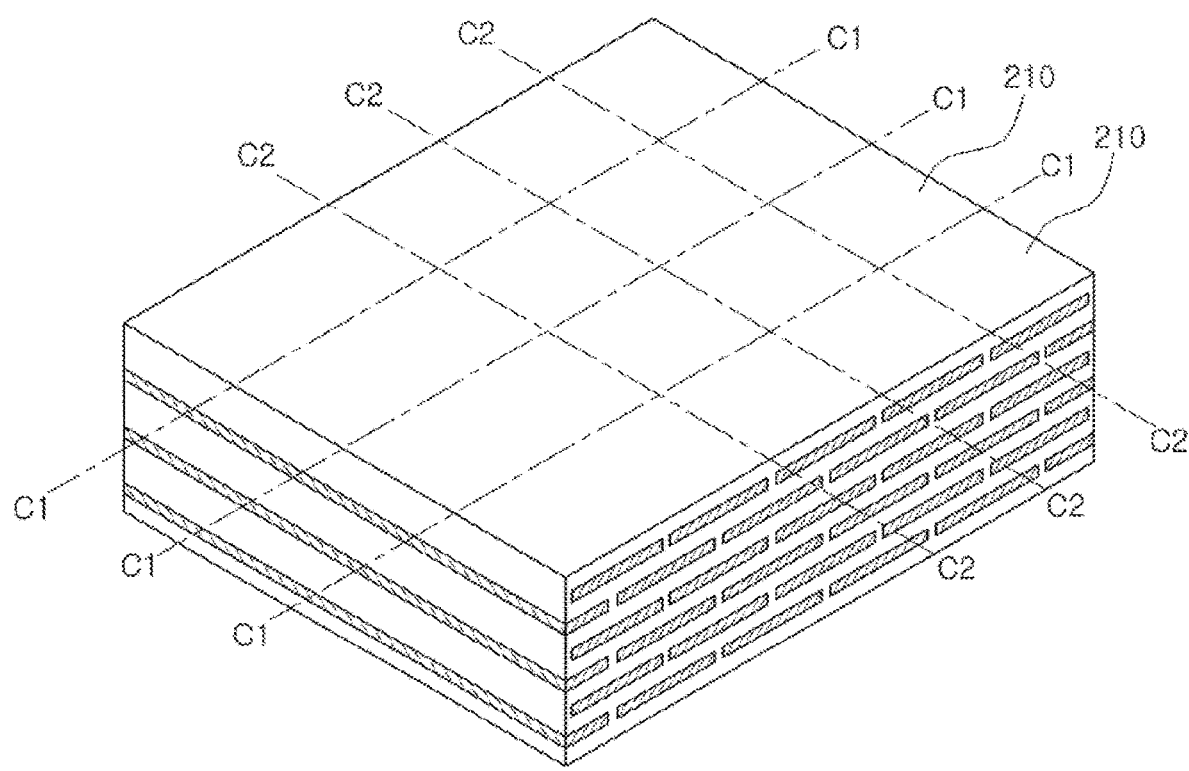

FIG. 5C is a cross-sectional view of a ceramic green sheet stack body 220 in which first and second ceramic green sheets are stacked according to an exemplary embodiment of the present disclosure. FIG. 5D is a perspective view of the ceramic green sheet stack body 220 in which first and second ceramic green sheets are stacked.

Referring to FIGS. 5C and 5D, the first ceramic green sheet on which the plurality of stripe-type first internal electrode patterns 221 formed in parallel to each other are printed and the second ceramic green sheet on which the plurality of stripe-type second internal electrode pattern 222 formed in parallel to each other are printed may be alternately stacked.

In more detail, the first and second ceramic green sheets may be stacked in such a manner that intervals between central portions of the stripe-type first internal electrode patterns 221 printed on the first ceramic green sheet and the stripe-type second internal electrode patterns 222 printed on the second ceramic green sheet overlap with each other.

Then, as shown in FIG. 5D, the ceramic green sheet stack body 220 may be cut to intersect the plurality of stripe-type first internal electrode patterns 221 and the plurality of stripe-type second internal electrode patterns 222. That is, the ceramic green sheet stack body 220 may become stack bodies 210 formed by cutting the ceramic green sheet stack body 220 along cutting lines C1-C1 and C2-C2 that are perpendicular to each other.

In more detail, the stripe-type first internal electrode pattern 221 and the stripe-type second internal electrode pattern 222 may be cut in a length direction to be divided into a plurality of internal electrodes with a constant width. In this case, the stacked ceramic green sheets may also be cut along with the internal electrode patterns. Accordingly, the dielectric layer may be formed with the same width as a width of the internal electrode.

The ceramic green sheet stack body 220 may be cut along the cutting line C2-C2 depending on a size of a separate ceramic body. That is, the plurality of stack bodies 210 may be formed by cutting a bar-type stack structure along the cutting line C2-C2 with a ceramic body size before the first side margin portion and the second side margin portion are formed.

That is, the bar-type stack structure may be cut to cut overlapping predetermined intervals formed between the central portions of the first internal electrodes and the second internal electrode along the same cutting line. Accordingly, one end portions of the first internal electrode and the second internal electrode may be alternately exposed through the cut surface.

Then, the first side margin portion and the second side margin portion may be formed on the first and second lateral surfaces of the stack bodies 210.

Figure 5E:
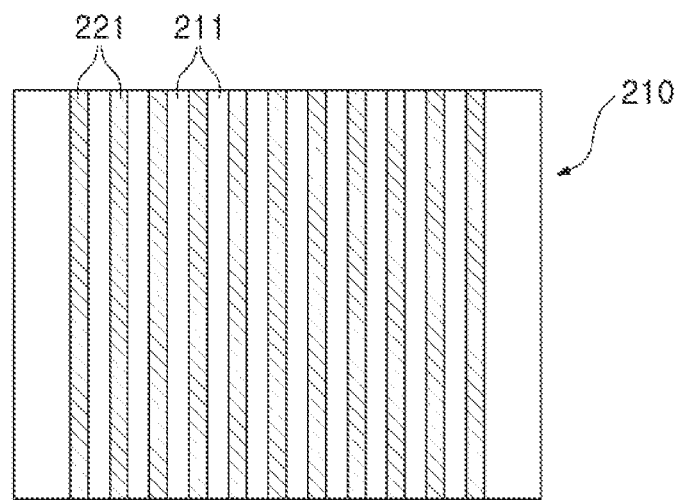
Figure 5E:
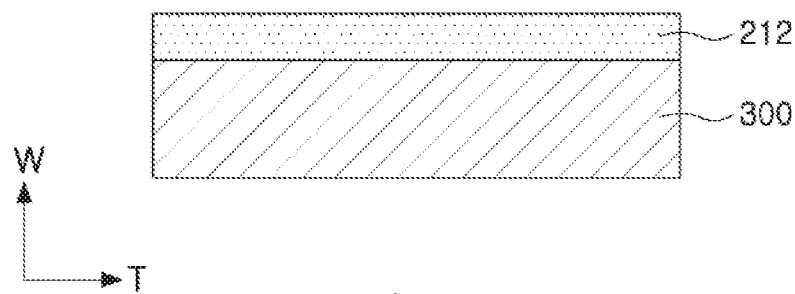

Then, as shown in FIG. 5E, first side margin portion 212 and second side margin portion (not shown) may be formed on the first and second lateral surface of the stack body 210, respectively.

In detail, the first side margin portion 212 may be formed using a method of disposing a lateral-surface ceramic green sheet 212 with adhesives (not shown) coated thereon on a punching elastic member 300 formed of rubber.

Then, the stack body 210 may be rotated at an angle of 90 degrees in such a manner that a first lateral surface of the stack body 210 faces the lateral-surface ceramic green sheet 212 with the adhesives (not shown) coated thereon and, then, the stack body 210 may be pressed-adhered to the lateral-surface ceramic green sheet 212 with the adhesives (not shown) coated thereon.

When the stack body 210 is pressed and adhered to the lateral-surface ceramic green sheet 212 with the adhesives (not shown) coated thereon to transfer the lateral-surface ceramic green sheet 212 to the stack body 210, the lateral-surface ceramic green sheet 212 may be formed to an edge of a lateral surface of the stack body 210 and the remaining portion may be cut due to the punching elastic member 300 formed of a rubber material.

Figure 5F:
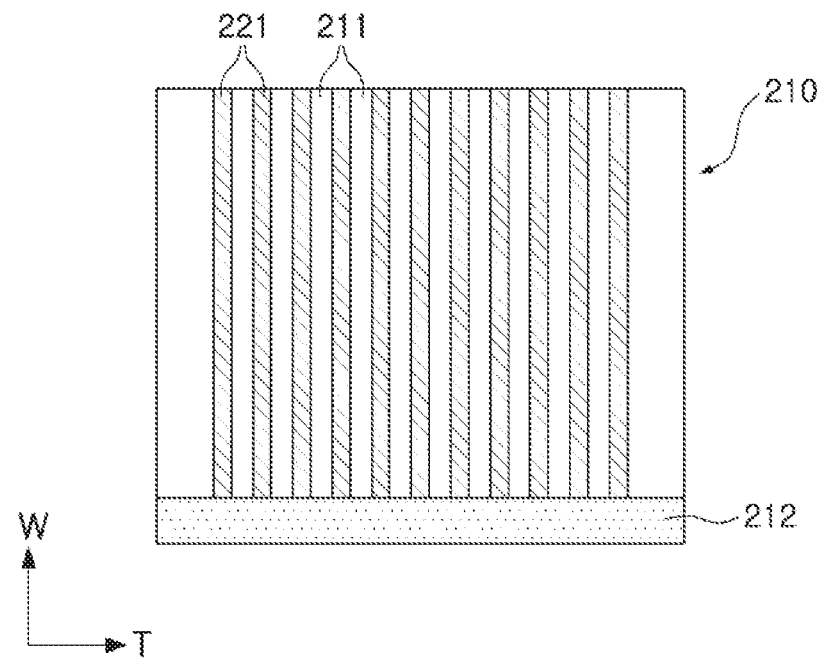

FIG. 5F illustrates the case in which the lateral-surface ceramic green sheet 212 is formed to the edge of the lateral surface of the stack body 210.

Then, the stack body 210 may be rotated and, thus, the second side margin portion may be formed on a second lateral surface of the stack body 210.

Then, a stack body with first and second side margin portions being formed on opposite lateral surfaces of the stack body 210 may be plasticized and sintered to form a ceramic body including a dielectric layer and first and second internal electrodes.

According to an exemplary embodiment of the present disclosure, adhesives are coated on the top of the lateral-surface ceramic green sheet 212 and, thus, the lateral-surface ceramic green sheet 212 may be transferred to a lateral surface of the stack body 210 at low temperature and low pressure, differently from the conventional case.

Accordingly, damage generated in the stack body 210 may be minimized and, thus, the electrical characteristics of a multilayer ceramic capacitor may be prevented from being degraded after being sintered, thereby enhancing reliability.

The lateral-surface ceramic green sheet 212 with adhesives coated thereon may be transferred to a lateral surface of the stack body 210 and may be pressed during a sintering procedure, thereby enhancing adhesive force between the stack body and the lateral-surface ceramic green sheet.

Accordingly, generation of a void at an interface between the ceramic body and the side margin portion after a sintering procedure may be repressed and a ratio of the edges of the internal electrode, on which the oxide region 140 is disposed, to an overall area of the plurality of internal electrodes 121 and 122 exposed through the first and second surfaces of the ceramic body according to an exemplary embodiment of the present disclosure may be adjusted to be less than 10%, thereby repressing generation of the oxide region.

Then, external electrodes may be respectively formed on a third lateral surface of the ceramic body, through which the first internal electrode is exposed, and a fourth lateral surface of the ceramic body, through which the second internal electrode is exposed.

According to another exemplary embodiment of the present disclosure, a lateral-surface ceramic green sheet is thin and has a small thickness deviation to ensure a large capacity formation portion.

In detail, an average thickness of the first and second side margin portions 112 and 113 may be between 2 µm and 10 µm after the first and second side margin portions 112 and 113 are sintered and a large size of the capacity formation portion may be ensured due to a small thickness deviation for each position.

Accordingly, it may be possible to embody a high-capacity multilayer ceramic capacitor.

In addition, a description of the same parts as in the aforementioned exemplary embodiment of the present disclosure is omitted here to avoid repetition of the description.

Although the present disclosure is described below in detail through Experimental Example, this is for aiding in understanding of the present disclosure and the scope of the present disclosure is not limited by Experimental Example.

Experimental Example

According to an exemplary embodiment of the present disclosure, Comparative Example in which a conventional side margin portion is formed without repressing generation of an oxide region on the edges of the internal electrode and Inventive Example in which a side margin portion is formed to repress generation of an oxide region on the edges of the internal electrode like in the present disclosure are prepared.

In addition, a ceramic green sheet stack body is formed in such a manner a side margin portion is formed by attaching a lateral-surface ceramic green sheet to an exposed portion of an electrode of a green chip without margin because an internal electrode is exposed in a width direction.

Predetermined temperature and pressure are applied under a condition with minimized modification of a chip and lateral-surface ceramic green sheets are attached to opposite surfaces of a ceramic green sheet stack body to manufacture multilayer ceramic capacitor green chip with 0603 size (width×length×height: 0.6 mm×0.3 mm×0.3 mm).

The completely manufactured multilayer ceramic capacitor test piece is plasticized at 400☐ or less and in a nitrogen atmosphere, is sintered at sintering temperature of 1200☐ or less and a condition of hydrogen ion concentration of H2 of 0.5% or less and, then, the electrical characteristics such as outer failure, dielectric resistance, waterproof characteristics are synthetically checked.

Figure 6:
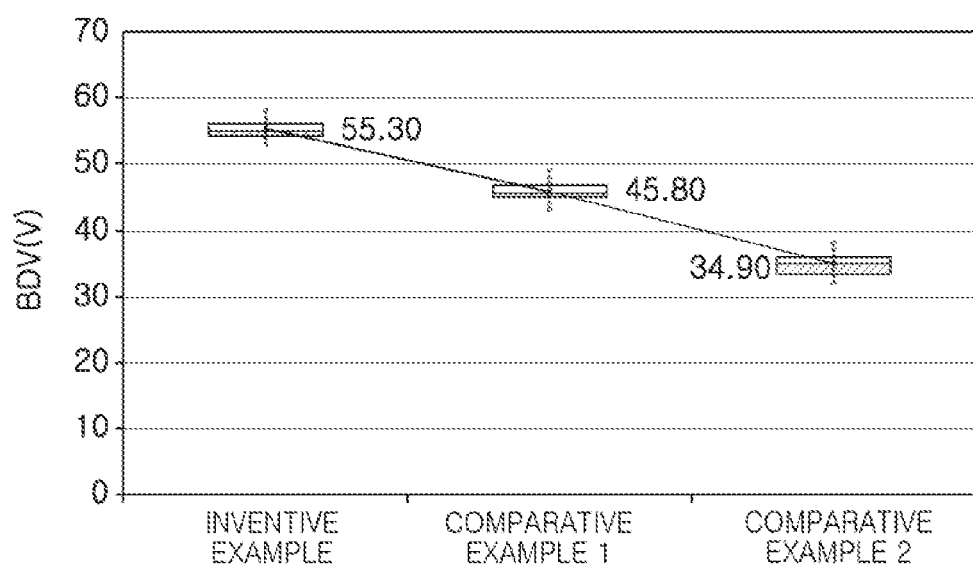
FIG. 6 is a graph showing comparison of a breakdown voltage (BDV) according to Inventive Example and Comparative Example.

FIG. 6 is a graph showing comparison of a breakdown voltage (BDV) according to Inventive Example and Comparative Example.

Referring to FIG. 6, Inventive Example corresponds to the case in which a ratio of an end portion of an internal electrode, on which an oxide region is disposed, to an overall area of the internal electrode exposed through the first and second surfaces of the ceramic body is adjusted to be less than 10% in a cross-section cut along a width-thickness plane of the ceramic body to manufacture a multilayer ceramic capacitor, Comparative Example 1 corresponds to a conventional multilayer ceramic capacitor configured in such a manner that a ratio to the edges of the internal electrode, on which the oxide region is disposed, to an overall area of the internal electrode exposed through the first and second surfaces of the ceramic body is equal to or greater than 80% in a cross-section cut along a width-thickness plane of the ceramic body, and Comparative Example 2 corresponds to the case in which a ratio of voids formed on edges of the internal electrode to an overall area of the internal electrode exposed through the first and second surfaces of the ceramic body is equal to or greater than 80% in a cross-section cut along a width-thickness plane of the ceramic body.

It may be seen that, in the case of the Inventive Example, a breakdown voltage (BDV) is enhanced, as compared to Comparative Examples 1 and 2 corresponding to the conventional multilayer ceramic capacitor.

In the case of Comparative Example 1, a breakdown voltage (BDV) is increased, as compared to Comparative Example 2 but is lower than in Inventive Example. Thus, according to an exemplary embodiment of the present disclosure, a ratio of the edges of the internal electrode, on which the oxide region is disposed, to an overall area of the internal electrode exposed through the first and second surfaces of the ceramic body may be adjusted to be less than 10%.

As set forth above, according to an exemplary embodiment in the present disclosure, an oxide region may be adjusted to be disposed on an end portion of an internal electrode, forming less than 10% of an external area of the internal electrode exposed through a surface of a ceramic body, on which first and second side margin portions are exposed and, thus, a ratio of a void and an oxide region are reduced to enhance a breakdown voltage (BDV) and to enhance reliability.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
 a ceramic body including a dielectric layer and having first and second surfaces opposing each other in a width direction of the ceramic body, third and fourth surfaces connecting the first and second surfaces in a length direction of the ceramic body, and fifth and sixth surfaces connected to the first to fourth surfaces and opposing each other in a thickness direction of the ceramic body;
 internal electrodes disposed inside the ceramic body, exposed through the first and second surfaces, and having one end portion exposed through the third or fourth surface; and
 first and second side margin portions disposed on edges of the internal electrodes, exposed through the first and second surfaces,
 wherein in a cross-section cut along a width-thickness plane of the ceramic body, an area of an oxide region disposed on the edges of the internal electrodes is less than 10% of an overall area of the internal electrodes exposed through the first and second surfaces.

2. The multilayer ceramic capacitor of claim 1, wherein the first side margin portion includes a first region adjacent to an external surface of the first side margin portion and a second region adjacent to the internal electrodes exposed through the first surface, and content of magnesium (Mg) included in the second region of the first side margin portion is greater than content of magnesium (Mg) included in the first region of the first side margin portion, and
 the second side margin portion includes a first region adjacent to an external surface of the second side margin portion and a second region adjacent to the internal electrodes exposed through the second surface, and content of magnesium (Mg) included in the second region of the second side margin portion is greater than content of magnesium (Mg) included in the first region of the second side margin portion.

3. The multilayer ceramic capacitor of claim 2, wherein a mole ratio of the content of magnesium (Mg) of the second region of the first side margin portion to content of titanium (Ti) included in the first side margin portion is 10% to 30%, and a mole ratio of the content of magnesium (Mg) of the second region of the second side margin portion to content of titanium (Ti) included in the second side margin portion is 10% to 30%.

4. The multilayer ceramic capacitor of claim 1, wherein a ratio of a thickness of a region of the first or second side margin portion, contacting an end of an internal electrode disposed as the outermost portion, to a thickness of a region of the first or second side margin portion, contacting an end of an internal electrode disposed at a central portion among the internal electrodes, is between 0.9 and 1.0.

5. The multilayer ceramic capacitor of claim 1, wherein a ratio of a thickness of a region of the first or second side margin portion, contacting an edge of the ceramic body, to a thickness of a region of the first or second side margin portion, contacting an end of an internal electrode disposed at a central portion among the internal electrodes, is between 0.9 and 1.0.

6. The multilayer ceramic capacitor of claim 1, wherein the internal electrode has a thickness equal to or less than 0.4 μm.

7. The multilayer ceramic capacitor of claim 1, wherein the first and second side margin portions have an average thickness between 2 μm and 10 μm.

8. The multilayer ceramic capacitor of claim 1, wherein the dielectric layer has thickness equal to or less than 0.4 μm.

9. A method of manufacturing a multilayer ceramic capacitor, the method comprising:

preparing a first ceramic green sheet on which a plurality of first internal electrode patterns are formed at a predetermined interval and a second ceramic green sheet on which a plurality of second internal electrode patterns are formed at a predetermined interval;

forming a ceramic green sheet stack body by stacking the first and second ceramic green sheets in such a manner that the first and second internal electrode patterns overlap with each other;

cutting the ceramic green sheet stack body to have a lateral surface through which edges of the first and second internal electrode patterns are exposed in a width direction;

forming first and second side margin portions on the lateral surface through which the edges of the first and second internal electrode patterns are exposed; and preparing a ceramic body including a dielectric layer and internal electrodes by sintering the cut ceramic green sheet stack body portion, wherein in a cross-section cut along a width-thickness plane of the ceramic body, an area of an oxide region disposed on edges of the internal electrodes is less than 10% of an overall area of the internal electrodes exposed through a lateral surface of the ceramic body, a thickness direction of the ceramic body is a direction along which the internal electrodes are stacked, and a width direction of the ceramic body is a direction along which the internal electrodes are exposed through the lateral surface.

10. The method of claim 9, wherein the first side margin portion includes a first region adjacent to an external surface of the first side margin portion and a second region adjacent to the internal electrodes, and content of magnesium (Mg) included in the second region of the first side margin portion is greater than content of magnesium (Mg) included in the first region of the first side margin portion, and the second side margin portion includes a first region adjacent to an external surface of the second side margin portion and a second region adjacent to the internal electrodes, and content of magnesium (Mg) included in the second region of the second side margin portion is greater than content of magnesium (Mg) included in the first region of the second side margin portion.

11. The method of claim 10, wherein a mole ratio of the content of magnesium (Mg) of the second region of the first side margin portion to content of titanium (Ti) included in the first side margin portion is 10% to 30%, and a mole ratio of the content of magnesium (Mg) of the second region of the second side margin portion to content of titanium (Ti) included in the second side margin portion is 10% to 30%.

12. The method of claim 9, wherein the first and second internal electrode patterns have a thickness equal to or less than 0.5 μm.

13. The method of claim 9, wherein a ratio of a thickness of a region of the first or second side margin portion, contacting an end of an internal electrode disposed as the outermost portion, to a thickness of a region of the first or second side margin portion, contacting an end of an internal electrode disposed at a central portion of the internal electrodes, is between 0.9 and 1.0.

14. The method of claim 9, wherein a ratio of a thickness of a region of the first or second side margin portion, contacting an edge of the ceramic body, to a thickness of a region of the first or second side margin portion, contacting an end of an internal electrode disposed at a central portion of the internal electrodes, is between 0.9 and 1.0.

15. The method of claim 9, wherein the first and second side margin portions have an average thickness between 2 μm and 10 μm.

16. The method of claim 9, wherein the first and second ceramic green sheets have a thickness equal to or less than 0.6 μm.

* * * * *